(No Model.) 6 Sheets—Sheet 3.
H. R. KENNEDY.
TYPE WRITING MACHINE.
No. 437,119. Patented Sept. 23, 1890.
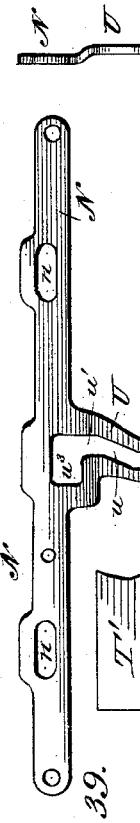
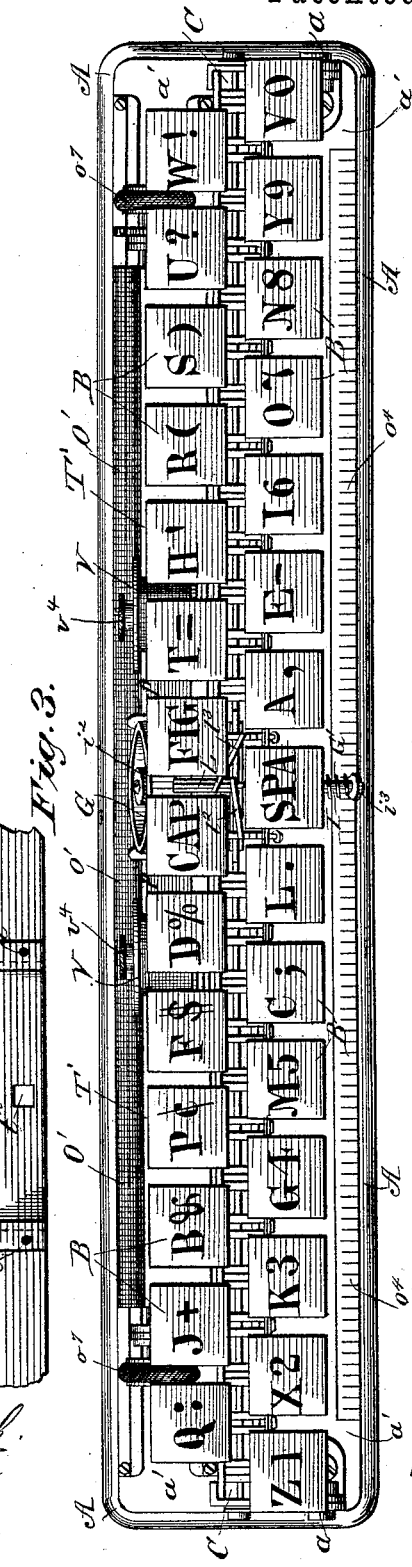
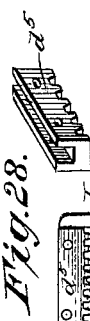
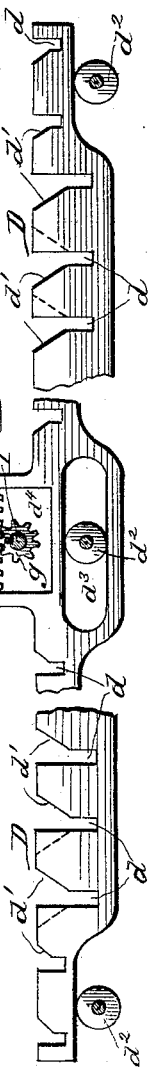
WITNESSES:
Phil C. Dieterich.
C. Sedgwick.
INVENTOR
H. R. Kennedy
BY Munn & Co.
ATTORNEY (No Model.) 6 Sheets—Sheet 4.
H. R. KENNEDY.
TYPE WRITING MACHINE.

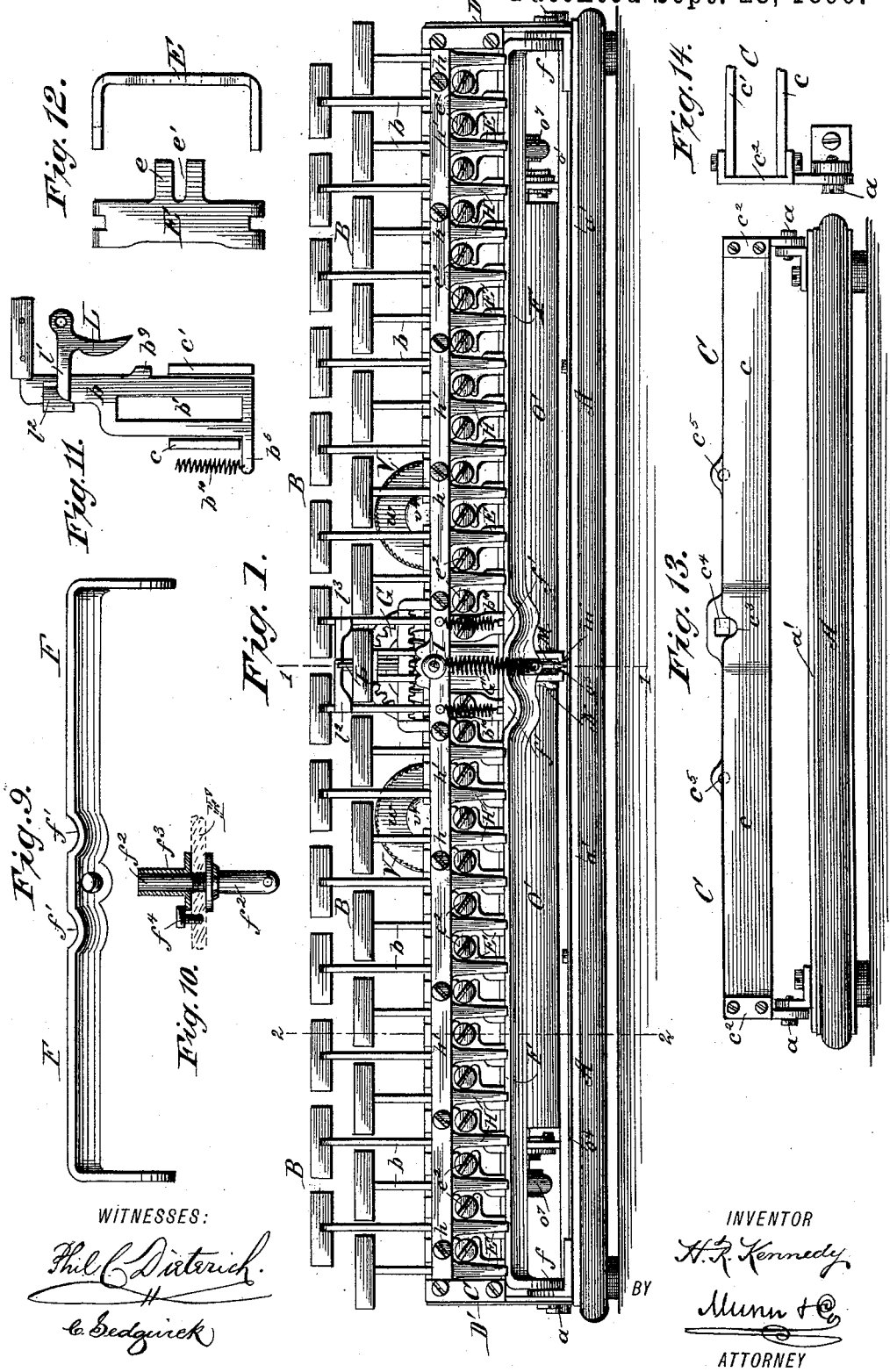

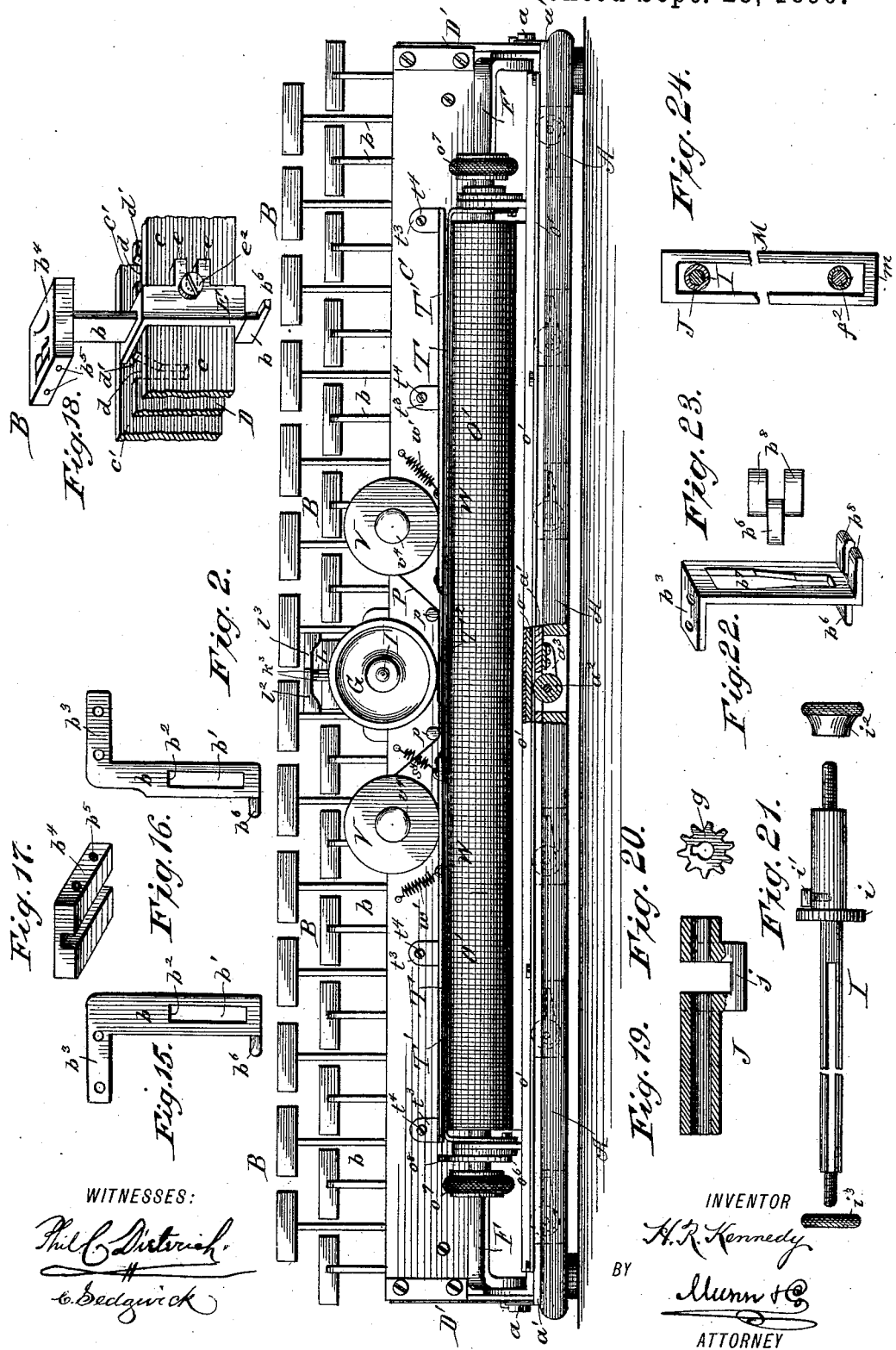

No. 437,119. Patented Sept. 23, 1890.

WITNESSES:
Phil C. Dieterich.
C. Sedgwick.

INVENTOR
H. R. Kennedy
BY Munn & Co.
ATTORNEY (No Model.) 6 Sheets—Sheet 5.

H. R. KENNEDY.
TYPE WRITING MACHINE.

No. 437,119. Patented Sept. 23, 1890.

WITNESSES:
Phil C. Dietrich
C. Sedgwick

INVENTOR
H. R. Kennedy
BY Munn & Co.
ATTORNEY (No Model.) 6 Sheets—Sheet 6.

H. R. KENNEDY.
TYPE WRITING MACHINE.

No. 437,119. Patented Sept. 23, 1890.

WITNESSES:
Phil C. Dietrich.
C. Sedgwick.

INVENTOR
H. R. Kennedy
BY Munn & Co.
ATTORNEY

UNITED STATES PATENT OFFICE.

HENRY R. KENNEDY, OF NEW YORK, N. Y.

TYPE-WRITING MACHINE.

SPECIFICATION forming part of Letters Patent No. 437,119, dated September 23, 1890.

Application filed April 25, 1889. Serial No. 308,538. (No model.)

*To all whom it may concern:*

Be it known that I, HENRY R. KENNEDY, of the city, county, and State of New York, have invented a new and Improved Type-Writer, of which the following is a full, clear, and exact description.

My invention relates to type-writing machines, and has for its object to provide a light, compact, inexpensive, and efficient machine of this character.

The invention consists in certain novel features of construction and combinations of parts of the type-writer, all as hereinafter described and claimed.

Reference is to be had to the accompanying drawings, forming a part of this specification, in which similar letters of reference indicate corresponding parts in all the figures.

Figure 4:
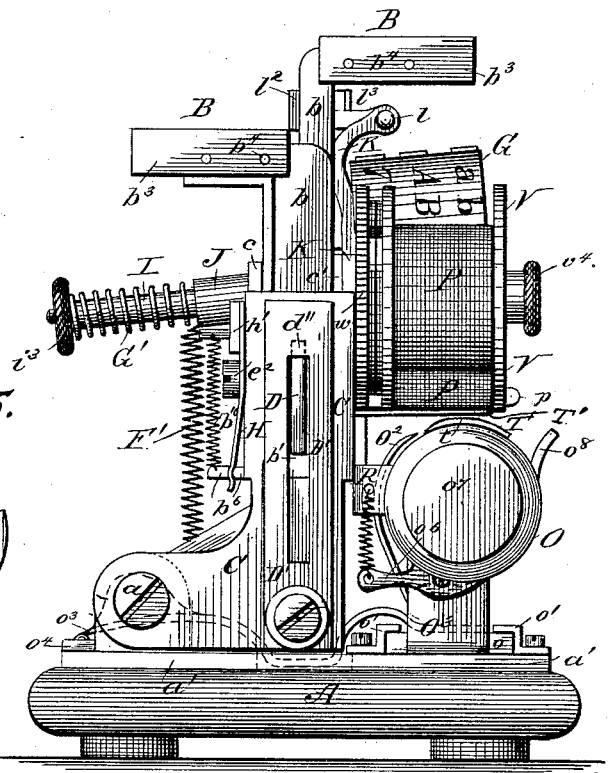
Figure 35:
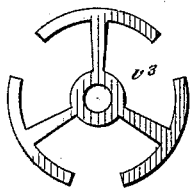
Figure 36:
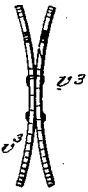
Figures 29, 30:
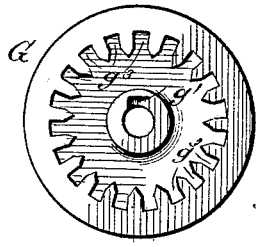
Figures 31, 32:
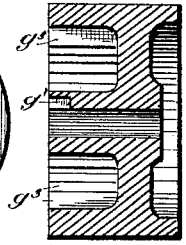
Figure 33:
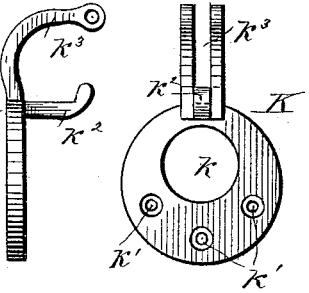
Figure 5:
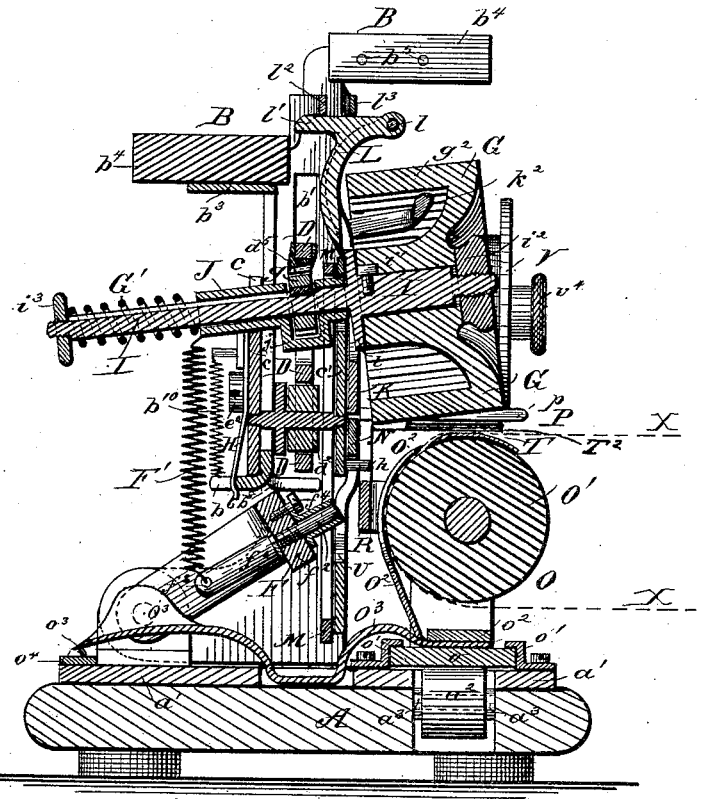
Figure 6:
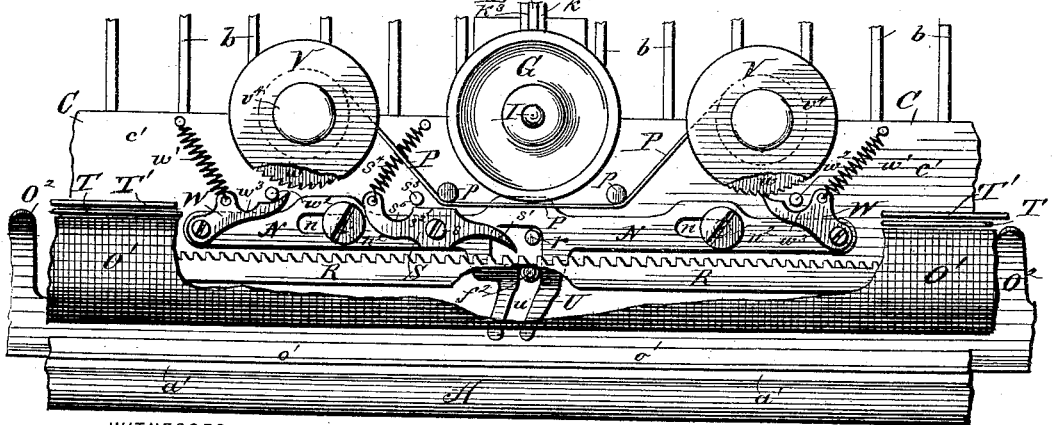
Figure 7:
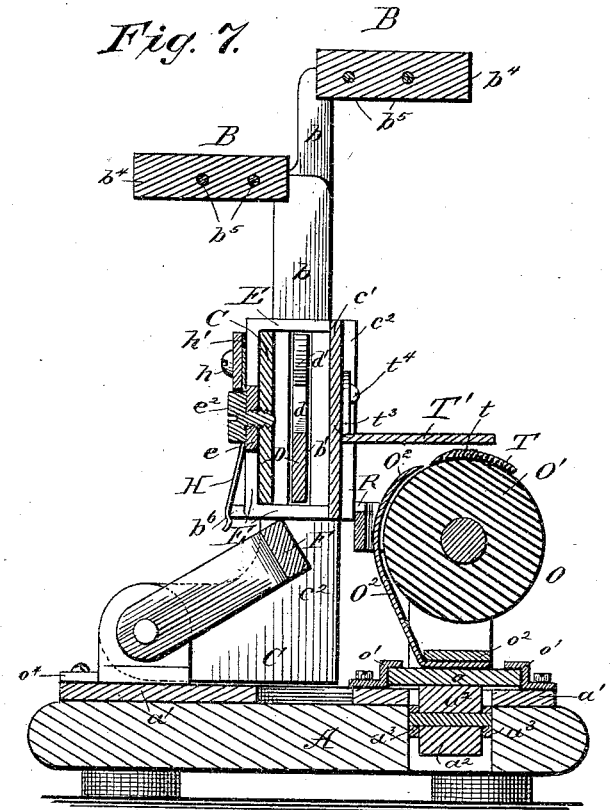
Figure 8:
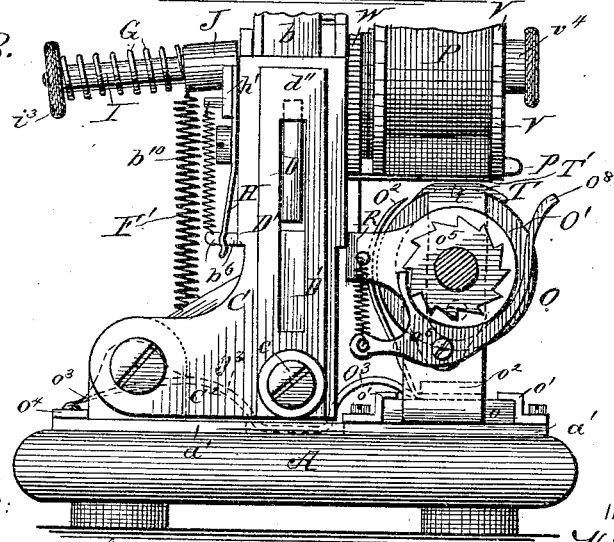

Figure 1 is a front elevation of my improved type-writer. Fig. 2 is a rear view thereof, partly broken away. Fig. 3 is a plan view thereof. Fig. 4 is an elevation of the right-hand end of the type-writer. Fig. 5 is a central vertical transverse section of the machine, taken on the line 1 1 in Fig. 1. Fig. 6 is an enlarged detail rear view of the paper-carriage-shifting mechanism and adjacent parts, which are broken away. Fig. 7 is a vertical transverse section of the machine, taken on the line 2 2 in Fig. 1. Fig. 8 is a partial elevation of the right-hand end of the machine, showing the line-spacing mechanism; and Figs. 9 to 39, inclusive, are detail views of various parts of the machine, which will be hereinafter particularly referred to.

This compact type-writing machine is supported on a bed or base plate A, of wood or other suitable material, and having a general rectangular form. The key-board B of the machine shown in the drawings is composed of twenty-nine keys, upon twenty-six of which are produced alphabetical characters, numerals, punctuation-marks, and special characters used in ordinary correspondence, each key bearing one letter and one punctuation-mark or special character. The keys range along transversely in two straight parallel rows, the rear row being higher than the front row, somewhat like the key-board of a piano. The front central key is the spacing-key, and is so designated by "SPA.," and the two central rear keys are the capital and figure or special-character keys, designated by "CAP." and "FIG.," respectively. The entire key-board, and also the type-wheel and the inking-spool and ribbon devices, are carried by a frame C, which at its opposite ends is provided with downwardly and forwardly projecting lugs, which are pivoted or fulcrumed by suitable screw pins or bolts $a\ a$ to lugs which rise from the bed-plate A of the machine or a metal plate $a'$, fixed thereto. This construction allows the entire key-board, type-wheel, and inking devices to be thrown over forward or toward the operator on the pins $a\ a$ to allow inspection of the writing produced on paper held on an impression-roller of a carriage disposed at the rear part of the machine, as hereinafter more fully explained.

I will particularly describe the key-board frame and keys, the type-wheel and its actuating mechanism, the paper-carriage and appurtenances, and the inking apparatus, in substantially the order named, as follows:

The key-board frame C is composed mainly of two parallel plates $c\ c'$, which are fixed to end plates $c^2\ c^2$, which are pivoted at $a\ a$ to the bed-plate $a'$ or to lugs thereon, and as will most clearly appear in Figs. 13 and 14 of the drawings. Between the plates $c\ c'$ are fitted to slide vertically the stems or body parts $b$ of the keys B, each of which, except the spacing-key, is provided with a vertical slot $b'$, receiving loosely a transversely-ranging bar or plate D, which is notched at the top and is beveled off at the notches, and is adapted for endwise movement by depressing any key, except the special-spacing, capital, and figure keys, to cause partial rotation of the type-wheel, as presently described.

Each of the twenty-six general keys B is sustained or guided at the frame C by a bent yoke E, which is shown in front and side view in Fig. 12, and well shown also in Figs. 7 and 18 of the drawings. This yoke is slotted at its top and bottom parts for passage of the key freely through it, and at its front the yoke has a lug $e$, provided with a horizontal slot $e'$, through which a set-screw $e^2$ is passed into the front plate $c$ of the key-frame C to hold the yoke and key to the frame while allowing free vertical play of the key in the yoke and in the top notches $d$ of the bar D, which has free endwise movement in the slot $b'$ of all the keys, except the spacing-key. It is manifest that by loosening the yoke set-screws the yokes of the general keys may be shifted on the frame C to bring the top end walls $b^2$ of the key-slots $b'$ in proper relation to the beveled edge wall or face $d'$ of the corresponding notch $d$ of the bar D to give easy proper endwise motion to the bar by depressing the keys, and also to allow wear of the contact-points of the keys and bar to be taken up at any time. The rear upper parts of a few of the yokes E are cut away to give room for reciprocation of the central raised lug or part of the bar D, which carries the rack $d^5$.

The main body portions of all the keys of the machine are stamped from sheet metal, preferably steel. The tangs $b^3$ of the front row of keys project forward or toward the operator from the slotted key-stems $b$, and the tangs $b^3$ of the higher rear row of keys extend rearward from their stems. The buttons or heads $b^4$ of all the keys, except the spacing-key, are provided at the under side with a slot to receive the tang of a key, and when the buttons are placed onto the key-tangs a couple of pins $b^5$ are passed through them to hold the buttons securely to the key-stems, but allow removal of them for renewal or to substitute other buttons bearing other characters should it be desired at any time to use another type-wheel bearing different characters or the same characters differently arranged. All of the keys are provided with a forwardly-projecting lug $b^6$ at the lower end to be acted on by a spring device, as hereinafter more fully explained. One of the stamped stems of the front row of keys is shown in Fig. 15, one of the stems of the rear row of keys is shown in Fig. 16, and one of the key buttons or heads is shown in Fig. 17 of the drawings.

The spacing-key stem (shown in perspective and bottom plan view in Figs. 22 and 23 of the drawings) is stamped out so as to set with its flat side toward the operator of the machine, and is provided with a slot $b^7$, through which the shaft of the type-wheel passes, and in which it may turn freely and have free vertical play without effect on the spacing-key, and this slot also allows depression of the spacing-key without effect on the type-wheel. The lower end of the spacing-key is slit twice and bent over both ways to form a lug $b^6$, substantially like the lugs $b^6$ on the other keys and for similar purpose, and also to form a couple of rearwardly-projecting lugs $b^8$ $b^8$, which when the key is depressed lower a rock bar or lever F to cause shifting of the paper-carriage for the space of one letter or character. This same effect on the rock-bar F is caused by contact with it of the lower end of any one of the other keys of the machine when depressed, except the capital and figure keys, as these last two keys operate when depressed only to give outward or backward bodily movement to the type-wheel, as hereinafter more fully explained. The button or head of the spacing-key is screwed or pinned onto the flat forwardly-bent top portion or tang of said key-stem.

As the office of the capital and figure keys is only to shift the type-wheel G backward bodily to bring the capitals and figures or special characters to the printing-point, the slots $b'$ of these keys are made longer than the slots in the general keys of the machine to prevent the top walls or ends of said slots from striking the bar D, which is not actuated by depression of either of these keys or the spacing-key. The lower ends of the capital and figure keys do not rest on the rock-bar F, which bar is provided at its upper edge with a couple of depressions $f'$ $f'$, which are directly below the capital and figure keys, and allow depression of these keys without lowering the rock-bar F, and consequently without actuating the paper-carriage or inking apparatus, which are operated from the rock-bar, as presently described. Both the capital and figure keys are provided with a shoulder $b^9$, which strikes the rear bar or plate $c'$ of the key-frame C to limit depression of the keys, which are restored to normal raised positions by springs $b^{10}$, attached at one end to the lower front lugs $b^6$ of the keys and at the other end to the key-frame or a plate held thereto.

The forwardly-bent parts of the rock-bar F are pivoted or fulcrumed at $f f$ to lugs at opposite ends of the bed-plate A, so as to hold the main part of the bar under the keys B, all of which, except the capital and figure keys, normally rest on the bar. This being the case, it is obvious that if any one of the keys, except the capital and figure keys, be depressed it will swing the rock-bar F downward on its pivots $f$, and if the other general keys and the spacing-key were not supported in some way they would fall with the rock-bar. To prevent this I provide a series of springs H, which are held at their upper ends to the key-frame C, and by their bent or recessed lower ends engage the lugs $b^6$ of all the keys, except the capital and figure keys, which are held up by the springs $b^{10}$, above mentioned. I prefer to make the springs H as a series of tongues projecting from the lower edge of a thin metal plate and to hold all the springs to the key-frame C by screws $h$, passed through a metal strip $h'$ laid against the outer or front face of the spring-plate and screwed into the key-frame, this making a cheap and efficient construction. It is manifest that the springs H hold up all the keys except those purposely operated. Hence when one key is depressed and lowers the rock-bar F none of the other keys will fall out of place, as they are held up by the springs.

The rock-bar F, which is shown detached in Fig. 9 of the drawings, is provided with a pin $f^2$, which is screwed into it from the front side until stopped by a shoulder or collar on the pin, and on the smooth rear end of the pin which projects through the rock-bar is placed a loose thimble $f^3$, which is held in place by a scew $f^4$, the head of which overlies loosely a flange on the inner end of the thimble. The thimble is thus free to revolve to lessen friction and present different wearing-surfaces to the bar and link by which the inking apparatus and type-wheel are actuated, as hereinafter explained. The rock-bar pin and thimble are shown in detail in Fig. 10 of the drawings. As the thimble $f^3$ is practically a part of the pin $f^2$, I will refer to both as the pin $f^2$ in further explanation of the machine. A spring F′, connected at one end to the rock-bar pin and at the other end to the type-wheel shaft, lifts both the rock-bar and type-wheel to normal raised positions.

The endwise-movable bar D, which slides in the slots $b'$ of the key-stems, controls the extent or distance of rotation of the face of the type-wheel either toward the right or left hand to bring the proper letter or character to the printing-point. The slots $d$ of this bar are cut away or beveled off at $d'$ at one side at the top. These beveled faces preferably slant downward toward the right hand at the right-hand end or part of the bar and slant downward toward the left hand at the left-hand end or part of the bar. (See Fig. 27 of the drawings, wherein the bar is shown partly broken away at each side of its center.) Anti-friction rollers $d^2$, journaled on pins or axles held to the key-frame C, sustain the bar and assure its easy motion, the center roller working in a slot $d^3$ of the bar to prevent vertical play of it. Above its center roller and slot the bar has a lug or projection, which is cut away or slotted at $d^4$ to receive a pinion $g$, which is held to the shaft of the type-wheel G, and is engaged by a rack $d^5$, which is fixed to the bar D at the top of its slot $d^4$. The shaft of the center roller $d^2$ is provided with a fixed collar, which acts as a washer between the roller and spacing-key, as shown in Fig. 5 of the drawings, to prevent depression of said key from having disturbing effect on the bar D, which the roller supports, and also on the type-wheel, which is operated from the bar.

It is obvious that when the bar D is moved to the left hand by any key depressed on one of its right-hand beveled faces $d'$ the pinion $g$, and consequently the connected type-wheel, will be partially rotated toward the left, and when the bar D is moved to the right hand by any key depressed on one of its left-hand beveled faces $d'$ the pinion $g$ and the type-wheel will be partially rotated in the opposite direction or toward the right, the extent of rotation of the wheel in every case being governed by the shape of the inclined face $d'$, on which the depressed key operates by its shoulder $b^2$, it being understood that the extent of endwise motion of the bar D in either direction will equal the horizontal distance between the point at which the key-shoulder $b^2$ strikes the inclined face $d'$ and the vertical lower part of the bar-slot $d$, into which the key-shoulder descends. After each endwise movement of the notched bar D, it is returned to a normal central position by one of two plate-springs D′ D′, one of which is fixed to each end of the key-frame C and acts on the adjacent end of the bar. These springs are slotted vertically to cause them to act on the opposite ends of the bar D by comparatively-narrow horizontal parts $d^{11}$ of them above the slots, to assure practically the same resistance of the springs for every movement of the bar D, whether longer or shorter, and thus assure practically the same measure of resistance to depression of the keys, whether the type-wheel be turned more or less to bring the proper character on it to the printing-point.

The type-wheel G (shown detached in Figs. 29 and 30 of the drawings) is held immovably to the enlarged rear end of a shaft I, which is provided with a collar $i$, against which the front side of the wheel rests. Next this collar the shaft has a headed stud $i'$, which enters a recess $g'$ of the wheel and prevents turning of the wheel on the shaft while assuring turning of it by and with the shaft. A retaining-nut $i^2$, threaded to the forward end of the shaft, binds the wheel securely thereto, but allows it to be easily and quickly removed for substitution of another wheel or for cleaning or other purpose. In front of the type-wheel and collar $i$ the shaft I is journaled in a bearing J, which is fulcrumed at or in a recess $c^3$ of the front plate $c$ of the key-frame C, and at each side of which recess the top flange or part $b^3$ of the spacing-key strikes to limit the depression of said key. The bearing J containing the shaft also passes freely through an opening $c^4$ made in a central upward extension of the rear plate $c'$ of the key-frame. The upper wall or margin of this opening forms a stop which limits the upward throw of the type-wheel by the spring F′. The bearing J is yoked downward at $j$ at its rear part, and within this yoke is placed on the shaft I the pinion $g$, which is splined to it, so as to cause the shaft to be turned by and with it, and also allow the shaft to be shifted endwise in the bearing and pinion by the operation of the capital and figure keys, as presently explained. On the front end of the shaft I and between the bearing J and a retaining nut or collar $i^3$ is placed a spiral spring G′, which normally draws the type-wheel G forward to hold its rear peripheral row of small or lower-case characters directly over the printing-point at the impression-roller. Fig. 5 of the drawings shows that the yoke $j$ of the shaft-bearing J and the type-wheel pinion $g$ both lie within the slot $d^4$ of the notched bar D. The type-wheel shaft, pinion, and bearing are shown in detail in Figs. 19, 20, and 21 of the drawings. The type-wheel is provided with an annular series of notches $g^3$ at the inside of its peripheral type-face, as shown most clearly in Fig. 29 of the drawings, any one of said notches being adapted to receive a relatively-fixed lug on the key-frame for positively steadying or locking the type-wheel as it is lowered for imprint of any one of the type on it, as hereinafter more fully set forth.

There are three rows of characters on the type-wheel periphery—a rear row of small or lower-case characters, a middle row of capital or upper-case characters, and a front row comprising figures or numerals, punctuation-marks, and other special characters. A plate K (shown in detail in Figs. 32 and 33 of the drawings) is provided with an opening $k$, through which the type-wheel shaft passes, and in which it may have free vertical movement. This plate is held to the rear face of the key-frame C and in front of the type-wheel by screws passed through holes $k'$ of the plate into the frame. The plate also has an arm or lug $k^2$, the extremity of which forms the lock or steadiment to the type-wheel by entering one of its notches $g^3$ as it is depressed for imprint. The plate K also has a couple of upwardly-extending lugs $k^3$, to and between the outer ends of which is pivoted by a pin $l$ a trip-lever L, the lower end or toe of which extends down in front of the collar $i$ of the type-wheel shaft I, while its upper nearly horizontal arm $l'$ extends forward in position to be depressed by either one of two lugs $l^2$ $l^3$, which project from the capital and figure keys, respectively, and overlie the arm $l'$ at different distances from the trip-lever fulcrum $l$, so that as the capital-key is depressed its lug $l^2$ will, by pressure on the lever-arm, throw the type-wheel backward against the tension of the spring G$'$ to bring the middle row of capital type to the printing-point, and as the figure-key is depressed its lug $l^3$ will operate the trip-lever to throw the type-wheel farther backward and carry the front row of characters or numerals or other special type to the printing-point. Immediately the capital or figure keys are released the spring G$'$ restores them and the type-wheel to normal positions ready for printing ordinary lower-case characters. The trip-lever L is shown detached in Fig. 31 of the drawings. The relative arrangement of type characters on the type-wheel is shown in Fig. 4 of the drawings.

However the type-wheel may be adjusted to bring any particular character on it above the printing-point, the wheel is lowered to make the impression by contact of the rock-bar pin $f^2$ with the lower end $m$ of a link M, into the slot of which this pin enters and has vertical play, the upper end or cross-bar of said link being hung onto the type-wheel shaft-bearing J, between the sliding bar D and the rear plate $c'$ of the key-frame C. The link M extends nearly to the bed-plate A, and is struck by the rock-bar pin $f^2$ only as the rock-bar reaches or approaches the extreme limit of its downward movement by a key and after the notched bar D has been shifted endwise to rotate the type-wheel G to bring the proper character to the printing-point, and as will be hereinafter more fully explained. This link M is shown broken away in Fig. 24 of the drawings, which also shows the type-wheel shaft and bearing I J and the rock-bar pin $f^2$ within the end parts of the link. The pin $f^2$ of the rock-bar F not only lowers the type-wheel for imprint by action on the link M, but it acts upon a cam-bar N to shift the paper-carriage O and its appurtenances, and also to feed the inking-ribbon P from either one of its two spools to the other spool as imprint of each type is made, and as hereinafter explained.

The paper-carriage O has a base-plate $o$ fitted to slide on anti-friction rollers $a^2$, preferably five in number, and journaled to bearing-plates $a^3$, fixed to the under side of the metal plate $a'$ on the main bed-plate A. The carriage-plate $o$ is guided by two suitably-flanged plates $o'$ $o'$, also fixed to the plate $a'$ and overlying opposite edges of the plate $o$. The impression-roller O$'$ is journaled in end brackets or lugs rising from the plate $o$, and a paper-holding and guide plate O$^2$ is sustained in front of the roller by a clamp-plate $o^2$, screwed over it and into the base-plate. A plate or bar O$^3$, fixed at the legthwise center of the carriage base-plate $o$, extends forward beneath the rock-bar F and within reach of the operator, who, by taking hold of said plate O$^3$, may shift the carriage by hand from the front of the machine. This plate O$^3$ extends at its rear end into a slot made in the lower rearwardly-bent flange of the guide-plate O$^2$, so that the same clamp-plate $o^2$ holds both plates O$^2$ O$^3$ to the carriage bed-plate $o$. At its central part the handle-plate O$^3$ is bent down into a lengthwise slot in the plate $a'$, so as not to interfere with the downward movement of the link M. (See Figs. 4, 5, and 8 of the drawings.) At its forward end the handle-plate O$^3$ is provided with a pointer $o^3$, which moves along a scale $o^4$ on the bed-plate A, as a gage indicating the relative location of the type-impressions across the paper. At one end, or it may be at both ends, the shaft of the impression-roller O$'$ is provided with a ratchet-wheel $o^5$, which is engaged normally by a spring-drawn pawl $o^6$, pivoted to the carriage, (see Fig. 8,) to lock the roller at rest when it shall have been set by turning either of its end wheels $o^7$ to hold the paper properly to receive the type-impressions. After each line is printed the roller will be turned until its pawl $o^6$ clicks once, which indicates proper movement or feed of the paper to receive the next line of printing. The pawl $o^6$ has a rearwardly and upwardly extending tail-piece $o^8$, which may easily be pressed by the index-finger of the operator to release the pawl from the ratchet-wheel $o^5$ to allow the impression-roller to be easily turned backward by other fingers of the same hand and without requiring the key-frame and its attachments to be swung over forward on the pivots $a$. The rack R of the paper-carriage extends along in front of the impression-roller, and is fixed at its bent ends to the roller-supporting lugs or brackets, and is toothed at its upper edge, where it is acted upon by a pawl S, which is pivoted to the cam-bar N, above mentioned, and is actuated from the rock-bar F, as presently described.

Above the impression-roller O' is arranged an impression-plate T, the downbent ends of which are fixed to the roller-brackets. This plate is made, preferably, of sheet metal and in concavo-convex cross-sectional form, so as to lie quite closely to the impression-roller O' for its whole length, and is sharpened or beveled off at its front edge, so that a sheet of paper to be type-written when slipped up from behind under the roller O' will pass between it and the guide-plate $O^2$, and will also pass over the impression-plate T, which is made with a flat top central portion at $t$, where the type on the lowered wheel G will print the paper. This flat portion $t$ of the plate T is as broad or a little broader than the type-wheel characters are long or high. Hence as the type-wheel is brought down to make an impression it will strike the inking-ribbon P, which rests next the paper, and will press the paper to the platen T, which in turn will be reenforced or backed by the impression-roller. This platen permits the use of a comparatively small impression-roller, while assuring a perfect imprint of the type on the paper, as the platen always presents sufficient surface to resist pressure of the entire area of the type-wheel characters. I have also provided a simple guard device, which is shown best in Figs. 2, 38, and 39 of the drawings, and effectually prevents smearing or blurring by the inking-ribbon of a sheet of paper being passed over the impression-roller O' or over the impression-plate T when the latter is used. This guard in its preferred form consists of a couple of plates T' T', preferably stamped from sheet metal and having upbent lugs $t^3$, through which screws $t^4$ are passed into the rear plate $c'$ of the key-frame C to hold said plates T' thereto horizontally between the impression-roller and the inking-ribbon spools and ribbon. These two plates T' T' extend at their inner ends not quite to the guide-pins $p$ $p$, beneath which the inking-ribbon passes from the spools, and to the ends of the plates are fastened by rivets or otherwise the opposite ends of a very thin metal plate $T^2$, which ranges along beneath the inking-ribbon P, and is provided with an aperture $t^2$, which is a little larger than the largest character on the type-wheel, and through which aperture the type being carried to the printing-point will carry the inking-ribbon to imprint the paper. It will be noticed that this guard-plate $T^2$ not only prevents contact of the paper with the inking-ribbon while the paper is being placed in the machine, but that it also prevents forcing the inking-ribbon onto the paper at any other point but that where the type strikes the ribbon to carry it to the point of impression, whether this be at the platen T or directly on the impression-roller. It is also manifest that by thus guarding the paper being placed in the machine from contact with the inking-ribbon the paper may be slipped in over the impression-roller while the keys and type-wheel are in operative positions and without running the carriage back until the roller is clear of the inking-ribbon, thus effecting saving of time of the operator and preventing undue wear of the machine.

Figure 37:
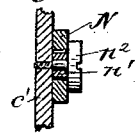

The cam-plate N (shown detached in Figs. 25 and 26 of the drawings, and shown best with its operative connections in Fig. 6) is provided with a couple of slots $n$ $n$, which receive anti-friction rollers $n'$ on screws $n^2$, which pass into the rear plate $c'$ of the key-frame C to hold the plate N thereto and allow its free endwise motion. Fig. 37 of the drawings shows the anti-friction roller and screw-connection of the cam-plate to the key-frame. At its center the cam-plate is provided with a pendent lug U, which is peculiarly slotted to receive the pin $f^2$ of the rock-bar F, which is actuated from the key-board of the machine. This slot is inclined laterally to the right hand at its center portion $u$ and is about vertical at its adjacent upper and lower portions $u'$ $u^2$, and at its top the slot is broadened to one side at $u^3$ to give room for a pin $r$, which is fixed to the key-frame C and stops the pawl S and the paper-carriage, as hereinafter more fully explained.

The paper-carriage-shifting pawl S is fulcrumed by a pin $s$ to the cam-plate N, and by its end $s'$ is adapted to engage the paper-carriage rack R. In the normal central position of the cam-plate, when the rock-bar pin $f^2$ is in the upper straight part $u'$ of the cam-plate slot, the upper straight or horizontal edge portion $s^2$ of the pawl will be held in contact with a pin $s^3$ in the key-frame C by a spring $s^4$, which is held at opposite ends to the back end of the pawl and to the key-frame. At these normal positions of the parts it is obvious that the pawl S is disengaged from the rack R, as shown in Fig. 6 of the drawings, and the paper-carriage is entirely free and may be moved either to the right or left hand on the main bed-plate of the machine. As soon, however, as the cam-plate N is shifted endwise to the left hand by the downward movement of the rock-bar pin $f^2$ in the inclined part $u$ of the cam-plate slot, the pawl S will be moved with the cam-plate until its face $s^2$ slips from under the key-frame pin $s^3$, a depression $s^5$ being provided in the tail of the pawl, which allows the spring $s^4$ to lift it and lower its effective end $s'$ into the rack R, which, as the cam-plate continues its movement, causes a feed of the paper-carriage O to the left hand for the space of one letter. As the pawl, now engaged with the rack R, strikes the stop-pin $r$, the motion of the carriage is stopped, it being allowed to move only a certain distance required to print one letter or character. As the rock-bar pin $f^2$ rises, it restores the cam-plate N to its original normal position and the pawl S again rides beneath the pin $s^3$, which lifts it from the rack R and again leaves the paper-carriage free.

The two ribbon-spools V V of the type-writer are made alike. Each spool is mounted loosely on a shaft $v$, provided next its inner end with a collar $v'$, next which it has a threaded end $v^2$, which screws into a tapped hole $c^5$ at the upper edge of the back plate $c'$ of the key-frame C. The holes $c^5$ for both spool-shafts are shown in Fig. 13 of the drawings. Onto the spool-shaft next its collar $v'$ is placed a ratchet-wheel $w$, with which a pawl W on the cam-plate N is adapted to engage, as presently explained. Next the ratchet $w$ is placed loosely on the spool-shaft a spring, which may be a disk or plate of rubber or a spiral metal spring, but which consists, preferably, of two elastic skeleton plates $v^3$ $v^3$, stamped out from sheet metal and in concavo-convex form, both plates being connected at their centers and with their convex faces next each other by riveting, soldering, or otherwise. The spring is clearly shown in face and edge views in Figs. 35 and 36, and in compressed condition in Fig. 34 of the drawings.

Figure 34:
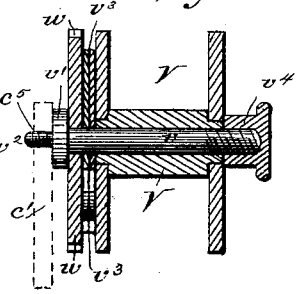

The spool proper V is held on its shaft $v$ by a milled nut $v^4$, which is threaded onto the end of the shaft and bears such relation to the spool and the ratchet-wheel $w$ that when the nut is screwed in so that its threaded aperture jams against the end of the shaft, as shown in Fig. 34 of the drawings, the spring $v^3$ next the spool will be compressed to cause sufficient friction on the spool V to hold it and the ratchet $w$ with sufficient force to cause the inking-ribbon to wind onto it from the other of the two spools V as the ratchet is actuated by its corresponding pawl W, the nut $v^4$ on the shaft of the other spool being loose to allow this action. The threads on the shafts of the two spools V V, and onto which the nuts are fitted, are made one right handed and the other left handed, so that the tighter spool will remain tight and the looser spool will remain loose.

The two pawls W W, which feed the inking-ribbon P from one spool V to the other, are made alike and are pivoted one to each end of the cam-plate N, and are normally held up by springs $w'$ attached to them and to the key-frame, and so that the inner free ends of the pawls will alternately be held up to stop-pins $w^2$ in the key-frame C, at which time or at one-half stroke of the cam-plate N one pawl will be held by the adjacent pin $w^2$ out of the ratchet $w$ of the adjacent ribbon-spool V, while the other pawl will have moved so that a depression or notch $w^3$ in its upper edge will by passing under the adjacent stop-pin $w^2$ allow this pawl to engage the ratchet of the other spool. The pawls will thus alternately engage and be disengaged from the adjacent spool-ratchet as the cam-plate N is moved endwise by the rock-bar pin $f^2$. The pawls are disengaged from the spool-ratchets to prevent excessive or too fast feed of the inking-ribbon, which would otherwise take place. The ends of the inking-ribbon P are connected to the two spools V V, and the ribbon passes under a couple of guide-pins or rollers $p$ $p$, which hold the ribbon horizontally below the type-wheel G. It is obvious that as the cam-plate N is reciprocated by the rock-bar pin $f^2$ the pawls W W by acting alternately on the ratchets $w$ $w$ of the two ribbon-spools V V will unwind the ribbon from one spool and wind it on the other one, and that by tightening the nut $v^4$ of one spool and loosening the nut of the other spool the ribbon will be wound onto the tighter spool from the looser spool. The ribbon can be renewed or another one of a different color substituted in a few moments by removing the nuts $v^4$ and slipping the spools and ribbon from the spool shafts and guides $v$ $p$ and substituting other spools, as will readily be understood.

In view of the aforesaid detailed description of the type-writer, a brief general statement of its continuous operation will suffice, as follows: To insert the sheet of paper X to be type-written it will simply be slipped in from the rear between the impression-roller O' and the paper-clamp plate or holder $O^2$, and thence upward and over the platen T of the carriage and between it and the guard-plate $T^2$, or between the impression-roller and the guard-plate. Should a capital letter be required in beginning the writing, the "Cap" key will be depressed. This shifts the lever L to move the type-wheel G back and bring the middle row of characters on it to the printing-point, and the ordinary key bearing the required character—say "Y"—will then be depressed. This causes the shoulder $b^2$ of key Y to act on the corresponding beveled face $d'$ of the bar D and move the bar endwise to cause its rack $d^5$ to turn the pinion $g$ and the type-wheel so as to bring the capital Y to the printing-point. Meanwhile the depression of key Y has also lowered the rock-bar F, whose pin $f^2$ by action in the inclined part $u$ of the slot in the cam-plate N has moved said plate to the left hand, and the pawl S on the plate by engaging the paper-carriage rack R has shifted the carriage one space to the left, and the inking-ribbon P has also been shifted by one of the pawls W. All this occurs before the rock-bar pin $f^2$ has reached the lower end $m$ of the link M; but when on the completion of the downstroke of the key Y the pin $f^2$ strikes said part $m$ of the link M, the latter will be moved downward bodily by the impact, and as the link is hung on the type-wheel shaft or bearing, it will carry the wheel downward as it tilts on its fulcrum $c^3$ at the key-frame, and the type character Y will be pressed to the inking-ribbon and will press it through the aperture $t^2$ of the paper-guard plate $T^2$, and this character will be printed clearly on the paper X, overlying the carriage-platen T, or the impression-roller O' were the platen not used. It will be noticed that as the type-wheel descends for imprint one of its internal grooves or notches $g^3$ will engage the relatively-fixed stud $k^2$ of the plate K to lock the type-wheel against rotation during the impression, and for similar purpose the lower end of the key Y has passed from the inclined face $d'$ of the bar D down into the lower straight portion of the bar-slot $d$, in which the key may have all necessary further movement of depression to actuate the rock-bar F, and through it the paper-carriage and inking-ribbon, in the manner hereinbefore explained. It will also be noticed that the rock-bar pin $f^2$ before it strikes the link M to lower the type-wheel G to make the impression enters the lower straight portion $n^2$ of the slot of the cam-plate N, and therefore locks this plate at rest and prevents its pawl S having effect to move or jar the paper-carriage, which thus is held perfectly still while the type is printing. The locking of both the type-wheel and carriage, as above explained, absolutely prevents blurred impressions of the type on the paper. I make special mention of the bar D having straight portions of its slot $d$ below the inclined faces $d'$, on which the key stems or bars act, as these straight parts of the slots while locking the type-wheel also allow full further depression of the keys to lower the type-wheel for making the imprint and to operate and lock the paper-carriage without actually breaking the connection between the parts of the mechanism, and allowing all movements of the machine for printing to be made by or through the medium of the keys directly, and without the aid of hammers or other devices for making the final impression on the paper. After the imprint is made both the "cap" and "Y" keys will be released, and as the spring G' draws the type-wheel G forward again into position to print by its rear row of ordinary lower-case or small-letter characters, the spring F' will swing up the type-wheel on its fulcrum $c^3$ clear of the inking-ribbon and paper, and will also lift the rock-bar F, which in rising will by its pin $f^2$ restore the cam-plate N and the depressed key Y to normal positions and complete the actuation of the inking-ribbon and unlock the pawl S from the paper-carriage rack R, and as the key lifts clear of the notches in the bar D the latter will be restored to normal position by the end springs D', and in making this movement the bar will, through its rack $d^5$ and the pinion $g$, rotate the type-wheel back to its normal position or to that adjustment from which it will be partially rotated, either in one direction or the other, by depression of the next one of the twenty-six ordinary keys of the machine to bring the proper character to the printing-point.

When a numeral or other character in the third or front row of type-wheel characters is required, it is only necessary to depress the "Fig." key first and then depress the ordinary key bearing the character it is desired to print. When word-spacing is required, it is only necessary to depress the "Spa." key, which will in turn depress the rock-bar F, and its pin $f^2$ will actuate the cam-plate N to shift the paper-carriage for the space of one letter; but no imprint will be made, as the spacing-key will be stopped by the key-frame plate $c$ before it can lower the rock-bar sufficiently to actuate the link M, which must be done before the type-wheel can make an impression at the paper-carriage. To space the lines apart it is only necessary to turn the impression-roller O' of the paper-carriage by its end wheel $o^7$ until the pawl $o^6$ clicks once, which will feed the paper forward for the next line of printing.

I am not limited to the precise arrangement of the type characters on the keys shown in the drawings, as their location on the type-wheel and consequently on the keys may vary, as preferred, and in making changes in this respect I may find it convenient or necessary to bevel off both upper edges of the slots $d$ of the bar D, as indicated by a few dotted lines in Fig. 27 of the drawings, so that two adjacent keys B B will shift the bar in opposite directions, and consequently turn the type-wheel in different directions. Various modifications of other parts of the mechanism of the machine may be made within the scope of my invention.

Having thus described my invention, what I claim as new, and desire to secure by Letters Patent, is—

1. In a type-writer, the combination, with a frame, of an endwise-movable bar provided with a rack, a type-wheel carrying a pinion engaging the rack of the said bar, and a series of keys adapted to engage directly with the said bar to move it, substantially as described.

2. In a type-writer, the combination, with a frame, of an endwise-movable bar having inclined faces and provided with a rack, a type-wheel carrying a pinion engaging the rack of the said bar, and a series of keys for engaging the inclined faces of the bar to move it, substantially as herein shown and described.

3. The combination, in a type-writer, of a frame, a series of keys thereon, an endwise-movable bar provided with a rack and having inclined faces on which the depressed keys act to shift the bar, a type-wheel carrying a pinion engaged by the rack, and yokes receiving the keys and held adjustably to the key-frame, substantially as described, whereby as the contact-faces of the bar and keys wear by use the wear may be taken up by readjusting the yokes, as set forth.

4. The combination, in a type-writer, of a frame, a series of keys thereon provided with slots $b'$, a bar D, fitted for endwise movement in said key-slots and provided with inclined faces $d'$, on which the keys act, and yokes E, held adjustably to the key-frame and supporting the keys, substantially as herein set forth.

5. The combination, in a type-writer, of a frame, a series of keys thereon, an endwise-movable bar having inclined faces on which the keys act to shift it, a rack on said bar, a type-wheel carrying a pinion engaged by the rack, and springs acting on the bar and restoring it and the type-wheel to normal positions after pressure on the key is removed, substantially as herein set forth.

6. The combination, in a type-writer, of a frame, a series of keys thereon, an endwise-movable bar having inclined faces sloping in opposite directions and on which the depressed keys act to shift the bar, a rack on said bar, and a type-wheel carrying a pinion engaged by the rack, substantially as described, whereby as the bar is moved endwise in opposite directions by depressions of keys on its reversely-sloping faces the type-wheel will be rotated in opposite directions to bring proper characters to the printing point, as set forth.

7. The combination, in a type-writer, of a supporting frame, a series of keys thereon provided with slots $b'$, an endwise-movable bar D, fitted in these slots and provided with a rack and with inclined faces $d'$, on which the keys act to shift the bar, retracting springs $D'$ for the bar, and a type-wheel carrying a pinion engaging the rack, substantially as herein set forth.

8. The combination, in a type-writer, of a frame, a series of keys thereon, a bar movable endwise by depression of the keys and provided with a rack, a bearing fulcrumed on the frame, a shaft journaled in the bearing and carrying a type-wheel, a pinion engaging the rack, and a spring normally holding the type-wheel away from the impression roller or platen, and means for depressing the type-wheel against the action of the spring, substantially as herein set forth.

9. The combination, in a type-writer, of a frame, a series of keys thereon provided with slots $b'$, an endwise-movable bar D, fitted in these slots and provided with a rack and with inclined faces $d'$, on which shoulders of the depressed keys act to shift the bar, a bearing fulcrumed on the key-frame, a type-wheel journaled in said bearing and carrying a pinion engaging the rack, and a spring normally holding the type-wheel away from the platen or impression-roller, substantially as herein set forth.

10. The combination, in a type-writer, of a frame, a series of keys thereon, a bar movable endwise by depression of the keys and provided with a rack, a tilting type-wheel carrying a pinion engaged by the rack, a rock-bar sustained below the keys and adapted for depression by them and provided with a pin, and a link or bar engaging the type-wheel shaft, with which the rock-bar pin engages, substantially as described, whereby as a key is depressed the type-wheel will be rotated to bring the proper character to the printing-point, and the wheel will be afterward depressed to make the imprint, as herein set forth.

11. The combination, in a type-writer, of a frame, a series of keys thereon, a bar movable endwise by depression of the keys and provided with a rack, a tilting type-wheel carrying a pinion engaged by the rack, a rock-bar sustained below the keys for depression by them and provided with a pin, a link or bar engaging the type-wheel shaft and adapted to be depressed by the rock-bar pin to make the wheel print, and a spring connected to the type-wheel bearing or shaft and to the rock-bar and raising both of them when pressure on the key is removed, substantially as herein set forth.

12. In a type-writer, the combination, with a frame and a series of keys thereon, of a bar provided with a rack and with which the keys engage to move it endwise, a tilting type-wheel carrying a pinion engaging the rack of the said bar, a rock-bar below the keys and adapted to be depressed thereby, a connection between the rock-bar and type-wheel to tilt the type-wheel as the said rock-bar is depressed, and springs normally holding all the keys raised except the one purposely operated to depress the rock-bar, substantially as herein shown and described.

13. The combination, in a type-writer, of a frame, a series of keys thereon, a bar movable endwise by depression of the keys and provided with a rack, a tilting type-wheel carrying a pinion engaged by the rack, a rock-bar sustained below the keys for depression by them and provided with a pin, a link or bar engaging the type-wheel shaft and with which the rock-bar pin engages to depress the type-wheel to make the imprint, and springs normally holding all the keys raised except the one purposely operated to depress the rock-bar, substantially as herein set forth.

14. The combination, in a type-writer, of a frame, a series of keys thereon provided with slots $b'$, an endwise-movable bar D, fitted in these slots and provided with a rack and with inclined faces $d'$, a bearing fulcrumed on the frame, a type-wheel journaled in said bearing and carrying a pinion engaging the rack, a link M, hung on the type-wheel bearing or shaft, and a rock-bar F, adapted for depression by the keys, and having a pin $f^2$ adapted to strike the link to lower the type-wheel for imprint after the wheel has been adjusted to present the proper character to the bed or platen, substantially as herein set forth.

15. The combination, in a type-writer, of a frame, a series of keys thereon, a bar movable endwise by depression of the keys and provided with a rack, a bearing fulcrumed on the frame, a shaft carrying a type-wheel and journaled in said bearing, in which it may move endwise, a pinion splined to the shaft and fitted in the bearing and engaging the bar-rack, a trip-lever fulcrumed to a support on the frame and adapted to shift the type-wheel bodily, and one or more special keys having a lug engaging the trip-lever, substantially as described, whereby when the special key is depressed the trip-lever will be actuated to shift the type-wheel to bring another row of characters on it to the printing-point and when one of the general keys is depressed the wheel will be rotated to bring the proper character of this row to the printing-point, as herein set forth.

16. The combination, in a type-writer, of a frame, a series of keys thereon, a bar movable endwise by depression of the keys and provided with a rack, a bearing J, fulcrumed on the frame, a shaft I, carrying a type-wheel G and splined pinion $g$ and journaled in said bearing, in which it may move endwise, a spring G', retracting the type-wheel, a trip-lever L, fulcrumed to a support on the frame, and one or more special keys having a lug, as $l^2$ $l^3$, engaging the trip-lever, substantially as herein set forth.

17. The combination, in a type-writer, of a frame, a series of keys thereon having slots $b'$, a bar D, fitted in the key-slots $b'$ and movable endwise by depression of the keys and provided with a rack, a type-wheel having a pinion engaging the rack, a spacing-key fitted to the frame and provided with lower lugs $b^8$, adapted to depress a rock-bar ranging below the keys for actuating a paper-carriage, said bar D having slots receiving anti-friction rollers or guides, and the guide or the shaft of the roller nearest the spacing-key being provided with a collar preventing contact of the key with the bar, substantially as herein set forth.

18. The combination, in a type-writer, of a frame, a series of keys thereon, a bar movable endwise by depression of the keys and provided with a rack, a tilting type-wheel journaled in a bearing fulcrumed on the frame and provided with a pinion engaging the rack, and also with internal grooves or notches $g^3$, a plate K, having lugs $k^2$ $k^3$ and held to the frame, a trip-lever L, hung to the lugs $k^3$, and one or more special keys having a lug, as $l^2$ $l^3$, engaging the trip-lever, substantially as herein set forth.

19. The combination, in a type-writer, of a key-frame, a series of keys thereon, a rock-bar adapted for depression by the keys and provided with a pin, a cam-plate provided with an inclined slot receiving the rock-bar pin, a paper carriage provided with a rack, and a pawl on the cam-plate adapted to the carriage-rack, substantially as described, whereby as the rock-bar is lowered by depression of a key it will shift the cam-plate and cause its pawl to feed the paper-carriage, as set forth.

20. The combination, in a type-writer, of a frame, a series of keys thereon, a bar movable endwise by depression of the keys and provided with a rack, a type-wheel carrying a pinion engaged by the rack, a rock-bar adapted for depression by the keys and provided with a pin, a cam-plate provided with an inclined slot receiving the rock-bar pin, a paper-carriage provided with a rack, and a pawl on the cam-plate adapted to the carriage-rack, substantially as described, whereby as a key is depressed the type-wheel will be rotated and the paper-carriage will be actuated, as herein set forth.

21. The combination, in a type-writer, of a frame, a series of keys thereon, a bar movable endwise by depression of the keys and provided with a rack, a tilting type-wheel carrying a pinion engaged by the rack, a link or bar engaging the type-wheel shaft or bearing, a rock-bar adapted for depression by the keys and provided with a pin, a cam-plate provided with an inclined slot receiving the rock-bar pin, a paper-carriage provided with a rack, and a pawl on the cam-plate adapted to the carriage-rack, substantially as described, whereby as a key is depressed the type-wheel will be rotated, the paper-carriage will be actuated, and the type-wheel will be depressed to make the imprint, as set forth.

22. The combination, in a type-writer, of a key-frame, a series of keys thereon, a rock-bar F below the keys and having a pin $f^2$, an endwise-movable cam-plate N, having an inclined slot $u$ receiving the pin $f^2$, a pawl S on the plate N, and a paper-carriage having a rack R engaged by the pawl, substantially as herein set forth.

23. The combination, in a type-writer, of a key-frame, a series of keys thereon, a rock-bar F below the keys and having a pin $f^2$, an endwise-movable cam-plate N, having a slot formed with an inclined central part $u$ and straight parts above and below it, said slot receiving the pin $f^2$, a pawl S on the cam-plate, and a paper-carriage having a rack R engaged by the pawl, substantially as herein set forth.

24. The combination, in a type-writer, with the key-frame and keys and a rock-bar depressed by the keys and having a pin $f^2$, of a cam-plate N, having an inclined slot $u$ receiving said pin, a pawl S, having a face $s^2$ and depression $s^5$, a spring $s^4$ for the pawl, stops $s^3$ and $r$ at the key-frame, and a paper-carriage having a rack R, which the pawl S is adapted to engage, substantially as herein set forth.

25. The combination, in a type-writer, of the key-frame and keys, a bar movable endwise by depression of the keys and provided with a rack, a type-wheel carrying a pinion engaged by said rack, a rock-bar F, adapted for depression by the keys and having a pin $f^2$, a plate N, having an inclined slot $u$ receiving the pin $f^2$, a paper-carriage having a rack R, and a pawl S on the plate N and adapted to the rack R and having a face $s^2$ and depression $s^5$, a spring $s^4$ for the pawl, and stops $s^3$ and $r$ at the key-frame, substantially as herein set forth.

26. The combination, in a type-writer, of the key-frame and keys, a bar movable endwise by depression of the keys and provided with a rack, a bearing J, fulcrumed on the key-frame, a shaft I, journaled in said bearing and carrying a type-wheel, a pinion $g$ on said shaft engaging the bar-rack, a link M on the shaft-bearing, a rock-bar F, adapted for depression by the keys and having a pin $f^2$, an endwise-movable plate N, having an inclined slot $u$ receiving the pin $f^2$, a paper-carriage having a rack R, and a pawl S on the plate N, adapted to engage the rack R, and having a face $s^2$ and depression $s^5$, a spring $s^4$ for the pawl, and stops $s^3$ and $r$ at the key-frame, substantially as herein set forth.

27. The combination, in a type-writer, of a frame, a series of keys thereon, a bar D, movable endwise in the frame and provided with a rack and a series of slots $d$, having inclined upper faces $d'$ and straight lower portions, a bearing supported on the frame, a shaft journaled in the bearing, a type-wheel on said shaft, and a pinion on the shaft engaging the bar-rack, substantially as described, whereby as a key is depressed the type-wheel will be rotated by action of the key on the inclined face $d'$ of the bar D to bring the proper character to the printing-point, and as the key is further depressed to cause the imprint it will enter the straight lower portion of the slot $d$ to lock the type-wheel against turning, as herein set forth.

28. The combination, in a type-writer, of a frame, a series of keys thereon, a bar D, movable endwise in the frame and provided with a rack and a series of slots $d$, having upper inclined faces $d'$ and straight lower portions, a bearing fulcrumed on the frame, a shaft journaled in the bearing, a type-wheel on said shaft, a pinion on the shaft engaging the bar-rack, a link M on the type-wheel shaft or bearing, and a rock-bar F, adapted for depression by the keys and having a pin $f^2$, entering the link, substantially as described, whereby as the key is depressed the bar D will be operated to turn the type-wheel and the wheel will subsequently be locked against turning, while the key is further depressed to cause the bar-pin $f^2$ to strike the link M and depress the type-wheel for imprint, as herein set forth.

29. The combination, in a type-writer, of a frame, a series of keys thereon, a bar D, movable endwise in the frame and provided with a rack and a series of slots $d$, having inclined upper faces $d'$ and straight lower portions, a bearing fulcrumed on the frame, a shaft journaled in the bearing, a type-wheel on said shaft, a pinion on the shaft engaging the bar-rack, a link M on the type-wheel shaft or bearing, a rock-bar F, adapted for depression by the keys and having a pin $f^2$ entering the link, a paper-carriage having a rack R, a plate N, having an inclined slot $u$ receiving the pin $f^2$, and a pawl on the cam-plate adapted to engage the paper-rack, substantially as described, whereby as a key is depressed the bar D will be operated to turn the type-wheel and the wheel will subsequently be locked against turning, while the key is further depressed to cause the rock-bar pin $f^2$ to feed the paper-carriage and lower the type-wheel for imprint, as herein set forth.

30. The combination, in a type-writer, of a key-frame and series of keys, an endwise-movable plate actuated from the keys and provided with two spring-actuated pawls W W, having recesses $w^3$, stops $w^2$ on the key-frame for the pawls, and a pair of inking-ribbon spools journaled on the frame and provided with ratchets on which the two pawls act alternately, substantially as herein set forth.

31. In a type-writer, the combination of two fixed shafts having right and left hand threads, respectively, at their outer ends, a spool on each shaft, an inking-ribbon on the two spools, a spring normally pressing each spool outward, nuts fitted to the right and left hand threads of the shafts, and mechanism turning the spools alternately in opposite directions, substantially as described, whereby the inking-ribbon is unwound from one spool the nut of whose shaft is loose and is wound onto the other spool the nut of whose shaft is tighter, and the tighter spool will remain tight and the looser spool will remain loose, substantially as herein set forth.

32. In a type-writer, the combination, with two shafts $v$ $v$, provided, respectively, with right and left hand threads at their outer ends, a ratchet-wheel $w$ and spool V on each shaft, an expanding-spring device placed between each ratchet-wheel and spool, an inking-ribbon on the two spools, and tightening-nuts $v^4$, fitted to the reversely-threaded ends of the two shafts outside the ribbon-spools, substantially as herein set forth.

33. In a type-writer, the combination, with a key-frame and series of keys, an endwise-movable plate or bar N, actuated from the keys, spring-drawn pawls W W on the bar N and having recesses $w^3$, stops $w^2$ on the frame for the pawls, shafts $v$ $v$, fixed to the frame and having right and left hand threads at their outer ends, a ratchet-wheel $w$ and spool V on each shaft, an expanding spring next each spool, nuts $v^4$, fitted to the threaded ends of the shafts, and an inking-ribbon wound on the two spools, all arranged for operation substantially as herein set forth.

34. In a type-writer provided with a paper-carriage at its rear part behind and below the key-board and printing mechanism, and a scale indicating the relative imprints of the type at its front part, a handle-plate connected to the carriage extending to the front of the machine and carrying at its free end a pointer moving along said front scale, substantially as described, for the purpose set forth.

HENRY R. KENNEDY.

Witnesses:
HENRY L. GOODWIN,
C. SEDGWICK.